United States Patent [19]
Ramelson et al.

[11] Patent Number: 5,781,745
[45] Date of Patent: Jul. 14, 1998

[54] HIGH SPEED COMMUNICATION BUS

[75] Inventors: Brian Ramelson, Brighton; Frank Itkowsky, Leominster; Peter Driscoll, Holliston; Cary Robins, Newton; Gary Lorenz, Littleton; Andreas Bovopoulos, Framingham, all of Mass.

[73] Assignee: 3Com Corporation, Santa Clara, Calif.

[21] Appl. No.: 651,804

[22] Filed: May 20, 1996

[51] Int. Cl.$^6$ .................................................. G06F 13/00
[52] U.S. Cl. ........................... 395/293; 395/200.55
[58] Field of Search ...................... 395/309, 281, 395/299, 301, 305, 291, 293, 287, 200.02, 200.05, 200.06, 200.2, 200.21, 200.8, 200.33, 200.55, 200.59

[56] References Cited

U.S. PATENT DOCUMENTS

| | | | |
|---|---|---|---|
| 5,459,840 | 10/1995 | Isfeld et al. | 395/309 |
| 5,530,842 | 6/1996 | Abraham et al. | 395/500 |
| 5,634,015 | 5/1997 | Chang et al. | 395/309 |

Primary Examiner—Glenna A. Auve
Attorney, Agent, or Firm—McGlew and Tuttle

[57] ABSTRACT

A computer network system containing a concentrator with a backplane that has a plurality of lines. The backplane contains data lines and control lines for managing and organizing the transfer of data between modules in the concentrator. The system contains intelligent devices that allow the selection of transmitting modules to occur at the same time as actual data transfer is going on between other modules. This is preferably done in a round robin arbitration process where, while data is being transferred by a first module, a bus arbitration device is placing addresses of modules which sequentially follow the transmitting module onto the control lines. Modules will see their address on the control lines, and if they have a packet to transmit, they then reserve the right to transmit after the presently transmitting module is finished. In this way the selection of the next module to transmit is performed in parallel, and does not slow down, the transfer of data between modules. The control lines are also able to indicate when a receiving module has been unable to copy a packet. The transmitting module can then resend the packet for either a maximum number of retries, or until the receiving module is able to copy the packet.

28 Claims, 15 Drawing Sheets

| Bit | 63..56 | 55..51 | 50 | 49..33 | 32 |
|---|---|---|---|---|---|
| Field | VLAN ID | Source Slot ID | Frame Type | Destination Slot | Reserved |

| Bit | 31..19 | 18..13 | 12..11 | 10..8 | 7 | 6 | 5..4 | 3..0 |
|---|---|---|---|---|---|---|---|---|
| Field | Pkt Size | Source Port ID | Monitor | Hver | FCS | F/P* | Reserved | Parity |

Figure 5

| Field | Bits | Description |
|---|---|---|
| Parity | 3..0 | Four bits of odd parity for remaining 60 bits of Header |
| Reserved | 5..4 | Transmitted as zero. Used in header parity computation. |
| F/P* | 6 | Flood/Point-point indicator. 1 indicates flood packet, 0 indicates point-point (source routed). |
| FCS | 7 | A value of 1 in this bit indicates the presence of a valid Data Link Frame Check Sequence in the encapsulated frame. Set to 1 for most native format packets, set to 0 for management generated or translated packets (with no FCS). |
| Hver2.. Hver0 | 10..8 | Binary encoded header version. Acceptable values are 0..7 The GBUS controller may be programmed to accept packets with any or all of the acceptable header versions. Packets with unacceptable header versions will be filtered in hardware. |
| Monitor 1..0 | 12..11 | Packet Monitoring Status: 00 No Monitoring – normal bridged packet 01 Destination slot should only Monitor this packet 10 Destination slot should bridge and Monitor this packet 11 Reserved |
| Source Port ID 5..0 | 18..13 | Binary encoded source port number corresponding to the port number from which this packet came. |
| Size 12..0 | 31..19 | Size of GBUS packet in bytes. This value represents the entire packet, including header. Thus, a 64 byte Ethernet packet would represent size as 64 + 8 = 72. It is important to note that this value is not necessarily an even multiple of GBUS words (8 bytes each). Thus, hardware on a transmitting blade must sense a size value that is not divisible by 8 and transmit one aditional GBUS word to transfer the extra bytes. |
| Reserved | 32 | Transmitted as zero. Used in header parity computation. |
| Dslot16.. Dslot0 | 49..33 | Bitwise encoded destination slot number corresponding to each destination blade's ONcore slot, starting at slot 0. One or more bits can be asserted in this field. |
| Packet Type | 50 | 0 = Ethernet 1 = FDDI |
| Sslot4..Sslot0 | 55..51 | Binary encoded source slot number corresponding to the source blade's ONcore slot, starting at slot 0. |
| VLAN7..VLAN0 | 63..56 | ID of the Virtual LAN to which this packet is destined. |

Figure 6

| Gbus header 8 bytes | Ethernet packet 64-1518 bytes, exclusive of preamble and SOF delimiter |

Figure 7

| Gbus header 8 bytes | FDDI packet 17-4495 bytes, exclusive of preamble and SOF delimiter |

Figure 8

| Analysis of Data Signals for GBUS | | | | | | | |
|---|---|---|---|---|---|---|---|
| *Xmit on CLK32 Rcv on CLK32 | | | | | | | |
| Lightspeed CLK-Q | MIN | MAX | | | | | |
| BTL Custom Receive 32MHz | 10.00 | 13.50 | | | | | |
| Active Delay Line | 3.98 | 6.03 | | | | | |
| BTL FB2031 LCAB to B | 3.20 | 5.60 | ***Philips number(TI not available) | | | | |
| Total CLK-Q | 17.18 | 25.13 | | | | | |
| | | | | | | | |
| Lightspeed Setup/Hold | | | | | | | |
| CLK Delay | | | | | | | |
| BTL Custom Receive | 10.00 | 13.50 | | | | | |
| Total CLK Delay | 10.00 | 13.50 | | | | | |
| Data Delay | | | | | | | |
| No delay | 0.00 | 0.00 | | | | | |
| Setup Time for Data (2031) | 2.50 | | ***Philips number(TI not available) | | | | |
| Hold Time for Data (2031) | 0.00 | | ***Philips number(TI not available) | | | | |
| Setup Time Required on BP | -7.50 | | | | | | |
| Hold Time Required on BP | 13.50 | | | | | | |
| | | | | | | | |
| Analysis of Control Signals | | | | | | | |
| Lightspeed CLK-Q | | | | | | | |
| BTL Custom Receive | 10.00 | 13.50 | | | | | |
| Active Delay | 3.98 | 6.03 | | | | | |
| BTL FB2033 LCAB to B | 3.20 | 6.60 | ***Philips AND TI numbers | | | | |
| Total CLK-Q | 17.18 | 26.13 | | | | | |

Figure 10a

| Lightspeed Setup/Hold | | | | | |
|---|---|---|---|---|---|
| CLK Delay | | | | | |
| BTL Custom Receive | 10.00 | 13.50 | | | |
| Total CLK Delay | 10.00 | 13.50 | | | |
| Signal Delay (Direct off backplane) | 0.00 | 0.00 | | | |
| Setup Time for Signal (2033) | 2.50 | | ***Philips AND TI numbers | | |
| Hold Time for Signal (2033) | 0.30 | | ***Philips AND TI numbers | | |
| Setup Time Required on BP | -7.50 | | | | |
| Hold Time Required on BP | 13.80 | | | | |
| | | | | | |
| | Data Timing | | | Control Timing | |
| | MIN | MAX | | MIN | MAX |
| CLK-Q | 17.18 | 25.13 | | 17.18 | 26.13 |
| Setup Req for Blade | -7.50 | | | -7.50 | |
| Hold Req for Blade | 13.50 | | | 13.80 | |
| | | | | | |
| Data End-End Delay | 3.20 | 7.60 | | 3.20 | 7.60 |
| CLK Delay Middle-End–Unloaded/Loaded | 2.50 | 4.50 | | 2.50 | 4.50 |
| CLK Delay Middle-End–Loaded Min. | 3.50 | | | 3.50 | |
| CLK Period for CTL | 31.25 | | | 31.25 | |
| | | | | | |
| | | Margin | | | Margin |
| Setup time allowed for module = | -2.48 | 5.02 | | -3.48 | 4.02 |
| CLK MEmax+DATA EEmax+CLKQmax-CLK MEmin | | | | | |
| | | | | | |
| Hold time allowed for module = | 14.28 | 0.78 | | 14.28 | 0.48 |
| CLKQmin+DATA EEmin/2-CLK MEmax | | | | | |

Figure 10b

Slot M Relinquishes the Bus, Slot M+2 Claims the Bus

Slot M Relinquishes the Bus, Slot M+3 Claims the Bus

HIGH SPEED COMMUNICATION BUS

FIELD OF THE INVENTION

The invention relates generally to a backplane bus architecture and its application thereof, and more specifically to concentrators in Local Area Network (LAN) and Wide Area Network (WAN) systems. The present invention also relates to LAN media connections to the backplane, and the monitoring and controlling of a LAN environment.

BACKGROUND OF THE INVENTION

Computer networks are presently carrying a larger and larger volume of information. Both documents and control signals are being sent from one computer to another through computer networks. The control signals are becoming lengthier as one computer tries to control more and more functions of another computer, and documents sent between computers are becoming lengthier, especially with the inclusion of special fonts styles and graphics in the documents. Also the increasing number of people desiring connection to the network increases the volume handled by the network. Delays in receiving documents and in controlling of the computers increases as the size of the documents, the complexity of the control signals and the number of users on the network increases. Therefore it is very desirably to move data from one network user to another as fast as possible. One approach to increasing data transfer is to increase the frequency of the network. The length of each bit is therefore decreased and more bits can be transferred in a given time period. However as the frequency increases, components must become more accurate and electrical signals start to behave as electromagnetic waves. These limitations form an upper limit, above which increases in the frequency become uneconomical.

The LAN standards in existence that pertain to this disclosure include: Digital Equipment Corporation/Intel/Xerox Ethernet™ Version 2.0; ISO/ANSI/IEEE 802.3 CSMA/CD; ISO/ANSI/IEEE 802.4 Token Bus; ISO/ANSI/IEEE 802.5 Token Ring; ISO/ANSI X3T9.5 FDDI (Fiber optic Distributed Data Interface)—a Token Passing Ring and the Galactica switching product.

Specifically in LAN applications of backplane buses, there are two well established access methods: Carrier Sense, Multiple Access with Collision Detection (CSMA/CD) and Token (Passing) Ring. Token Ring further includes a physical ring and physical bus manifestation. All of these access methods are used with multiple data rates and data formats, generating numerous protocols; in addition, there are other protocols which combine elements of both CSMA/CD and Token Passing, as well as protocols which use only some elements of the access methods (e.g. Carrier Sense, Multiple Access without Collision Detection).

SUMMARY AND OBJECTS OF THE INVENTION

It is an object of the present invention to provide a communication system where all the management and control functions occur in parallel with the actual data packet transfer, and thus incur little or no bandwidth overhead for the management and control. It is also an object of the present invention to provide a communication system which efficiently transfers data as fast as possible without slowing down the system by having to transmit management and control signals in between the transmission of the actual data.

The speed of the communication system is also increased by minimizing the number of retries for non-received packets and by handling the problem of dropped packets at a lower level or layer than in prior art systems. Handling dropped packets at a higher level is less efficient with regard to bandwidth.

The present invention attains these objectives by having a backplane bus that has a plurality of dedicated lines (communication paths), where a set or group of the lines are strictly reserved for the transfer of data. Several of the other lines convey different signals, namely management and control signals which allow the individual modules to manage and control the individual transmitting and receiving of data onto the backplane bus, without interrupting the flow of data on the data lines.

The backplane bus includes data signal lines and arbitration lines. The arbitration line includes, status signal lines, a retry signal line, a busy line, a plurality of slot select lines, a slot select acknowledgement line, a port not ready line, a port ready line, an election synchronization line and an arbiter active line. By each of the modules of a concentrator being able to communicate with all other modules of a concentrator over these lines, the modules of the present invention are able to elect an arbiter who will individually select which module is to transmit. Then that active arbiter is able to select each of the modules in a uniform manner for transmission onto the datalines. This is all done without having to have large gaps in between actual data transmission, and without each module having to monitor a line to determine if it has interfered with the transmission of an another module. In this way the backplane bus, especially its bandwidth, is used in a most efficient manner without the drawbacks of collisions, a single module dominating the backplane or the existence of large gaps between actual useful data transmissions.

When a module is an active arbiter, it places a signal on the arbiter active line. If for any reason an active arbiter can no longer function, the signal is removed from the arbiter active line. When a module notices that a signal is missing from an arbiter active line, or a module desires that a new election for active arbiter is necessary, the module will place a signal on the election synchronization line. When any module sees a signal on the election synchronization line, it also places a signal on this line for a predetermined amount of time. After the predetermined amount of time the signal is removed and each module has an arbiter version field which is a name or code and each module also has a slot ID for the particular slot of the concentration that the module is in. The modules place this arbiter version field and the slot ID on to one of the slot select lines bit by bit. The slot select lines are configured so that if two different types of bits or logic levels are placed on the line, only one of the logic levels will be dominant and will be present on the line. If a module notices that a logic level other than the logic level it placed on the slot select line is present, the module considers itself not elected and drops out of the election process. When all of the bits of the arbiter version field have been passed on to the slot select line, only one module should remain and this module becomes the active arbiter. The active arbiter then issues the arbiter active signal and begins to select modules for transmitting onto the backplane in a "round robin" manner.

The active arbiter places a slot ID or address of a module onto the slot select lines. If a particular module reads its slot ID on the slot select lines and this module has a packet to transmit, it places a signal on the slot acknowledgement line. The active arbiter then halts incrementing of the slot ID.

Once the bus is empty, the previously transmitting module will deenergize the busy line and the waiting module will de-assert the slot acknowledgement line and assert the busy line. The waiting module then transmits its data on to the data lines. When the active arbiter sees that the slot acknowledgement line has been deactivated or de-asserted, it advances the slot ID on the slot select lines to the next module. The active arbiter continues advancing the slot ID until another module with a packet to transmit sees its slot ID on the slot select lines and asserts the slot acknowledgement signal. In this way, each module has uniform access to the backplane bus and only those modules that actually have packets to transmit, are connected to the backplane bus and transmit over the datalines.

The timing of the management/control lines is such that there are three clock cycles per arbitration cycle to account for the clocking on and off of the signals between the modules and the backplane bus. The management/control signals therefore lead or lag the actual data transfer in order that the management/control signals can properly configure the modules to place data onto the data lines as soon as the previous module has finished transmitting data. This allows totally synchronous communication between modules at high clock frequency.

The active arbiter reads which modules are present in the concentrator and only places the slot ID's of those modules onto the slot select lines. This does not waste arbitration cycles for modules that are not present. Also, this arbitration of the present invention allows for back to back packets from a same module. If a module is transmitting data onto the datalines, the active arbiter will, at the same time or in parallel, be determining the next module to transmit onto the backplane. If all of the rest of the modules on the concentrator do not have packets to transmit, the active arbiter will increment the slot ID full cycle back to the original module which is transmitting.

With regard to electing the active arbiter, the present invention has the advantage that the arbitration version field can be divided into two parts, one which is a programmable value and the other which is the slot ID. In this way, certain modules can be given priority to be an active arbiter over the other modules, however no two modules will try to become active arbiter at the same time. The active arbiter maintaining an arbitration active signal is beneficial, in that all of the other modules are aware of when the active arbiter fails, especially when the module which contains the active arbiter is removed. The present invention is therefore able to automatically and quickly reconfigure itself upon the removal of a module.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 5 and 6 show the 64-bit structure of a data packet header;

FIG. 7 shows an Ethernet/802.3 packet format in a present invention;

FIG. 8 shows an FDDI packet format for a packet in the present invention;

FIG. 10 is a spreadsheet analysis of the timing characteristics of the backplane of the present invention;

DETAILED DESCRIPTION OF THE PREFERRED EMBODIMENT

Figure 1:
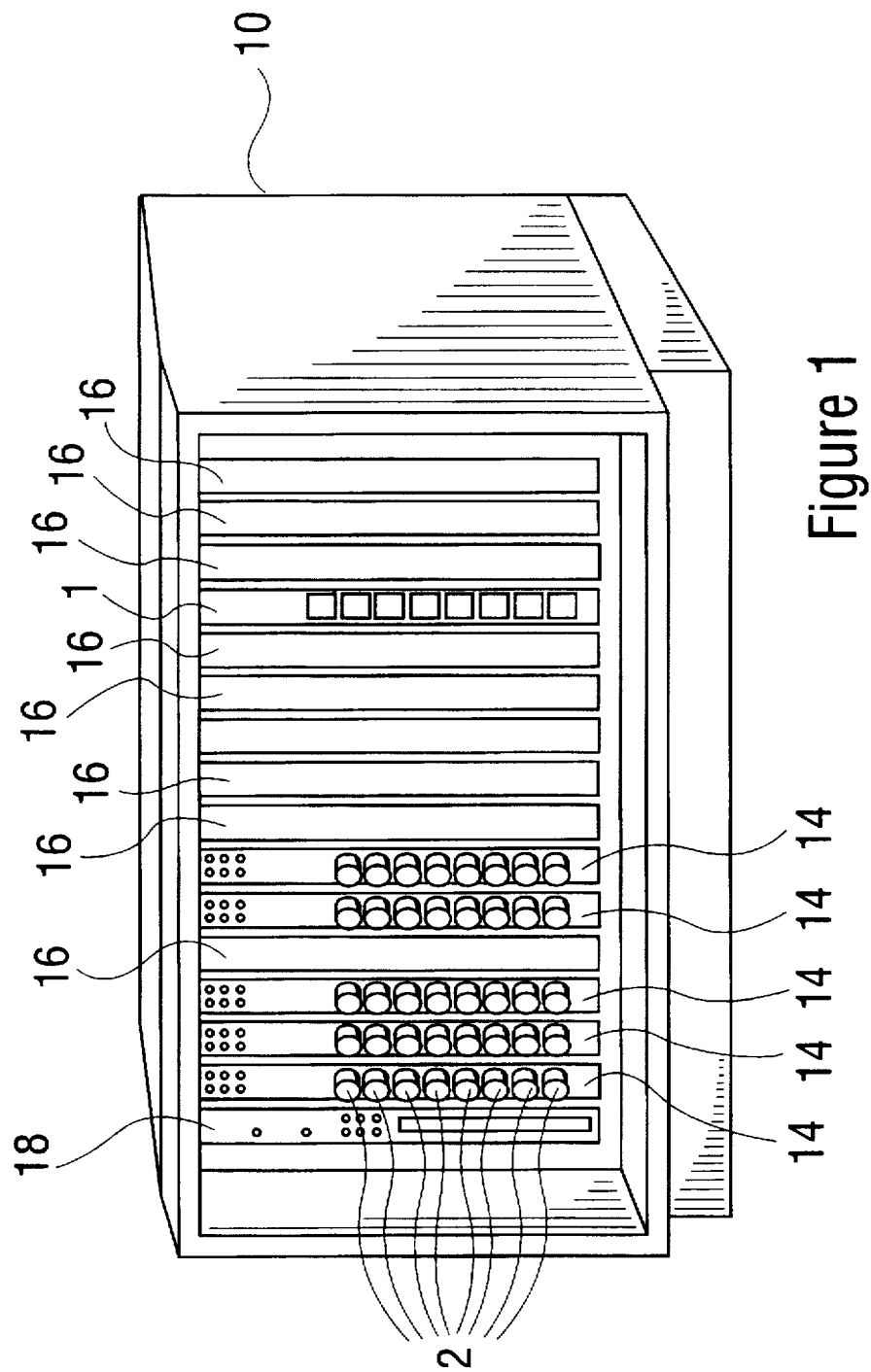
FIG. 1 is a perspective view of a concentrator containing several modules.
Figure 2:
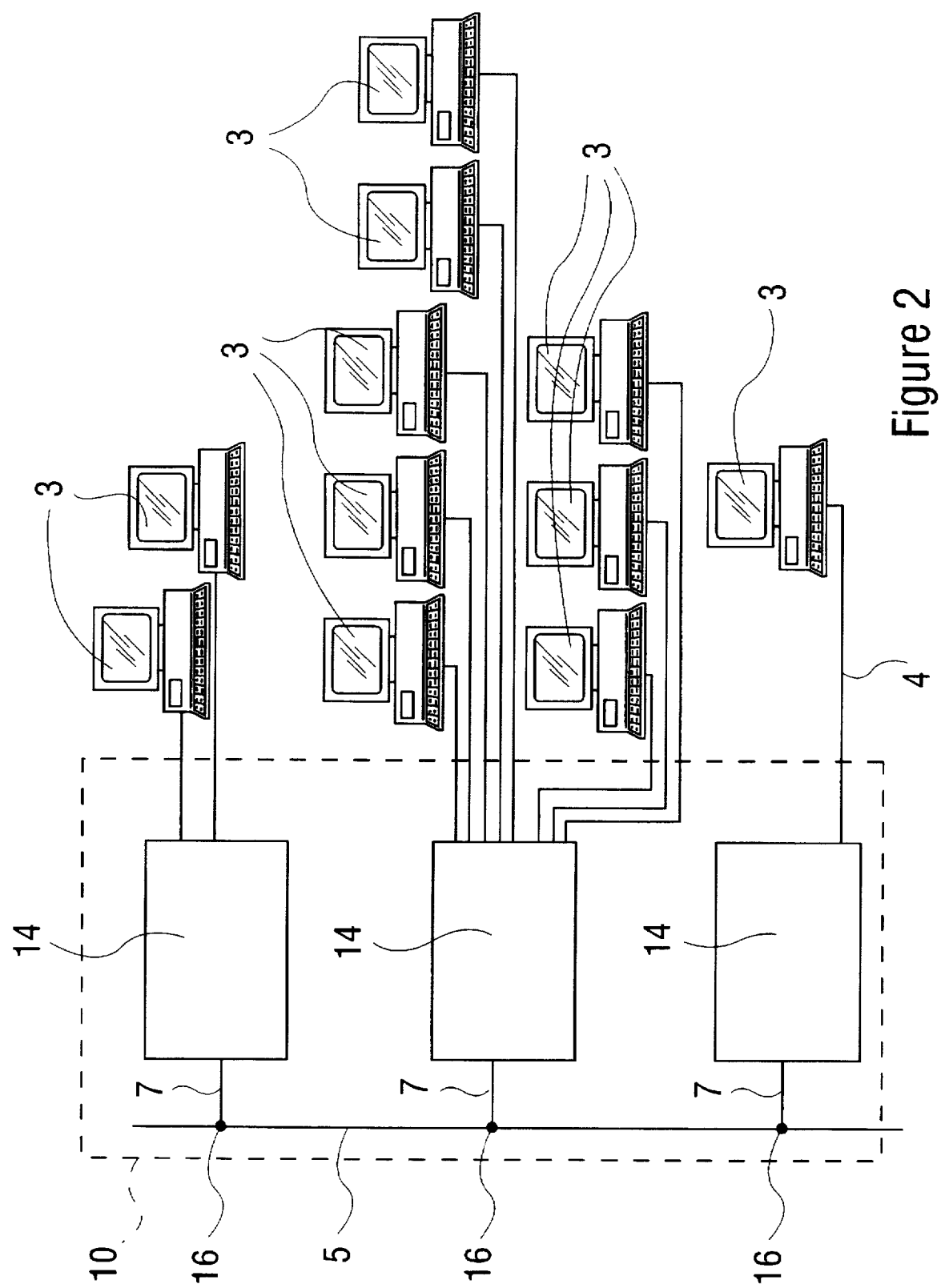
FIG. 2 is a schematic view of several work stations connected to modules of a concentrator.

Referring to the drawings in particular, FIG. 1 shows a concentrator 10 which contains a plurality of media modules 14 and a plurality of empty slots 16 which can be filled with modules. Each of the media modules 14 has a plurality of ports 2. As shown in FIG. 2, a plurality of stations 3 can be connected over cables 4 (or by other means) to the ports 2 of media modules 14. The concentrator 10 has a backplane bus 5, of which a portion is shown in FIG. 2. The backplane bus 5 connects the modules 14 to form a network such as a bus network. It is also possible to connect a plurality of concentrators to serve more users and to provide more than one network over the backplane of one concentrator. Two or more networks can be connected through bridge or router modules 1. In this way, the modules on several different concentrators can be connected to form a single bus network or users from different networks can be connected.

Each of the media modules 14 has a plug or tab 7 which plugs into one of the slots 16 of the backplane 5, as shown in FIG. 2. In this way all of the media modules 14 can communicate with each other. Other modules, such as power modules, management modules and/or control modules can be plugged into the slots 16.

In a concentrator 10, each of the slots 16 has an address or slot ID. The address or slot ID is used to determine which slot, or module in a slot, is being identified. This is done for such various purposes as indicating which module is transmitting, which module is to transmit next, and which modules are participating in an election of an arbiter. By each module in a slot asserting the proper signals on the corresponding lines at the proper time, management of a communication bus is possible at high speed and in a very efficient manner.

Figure 3:
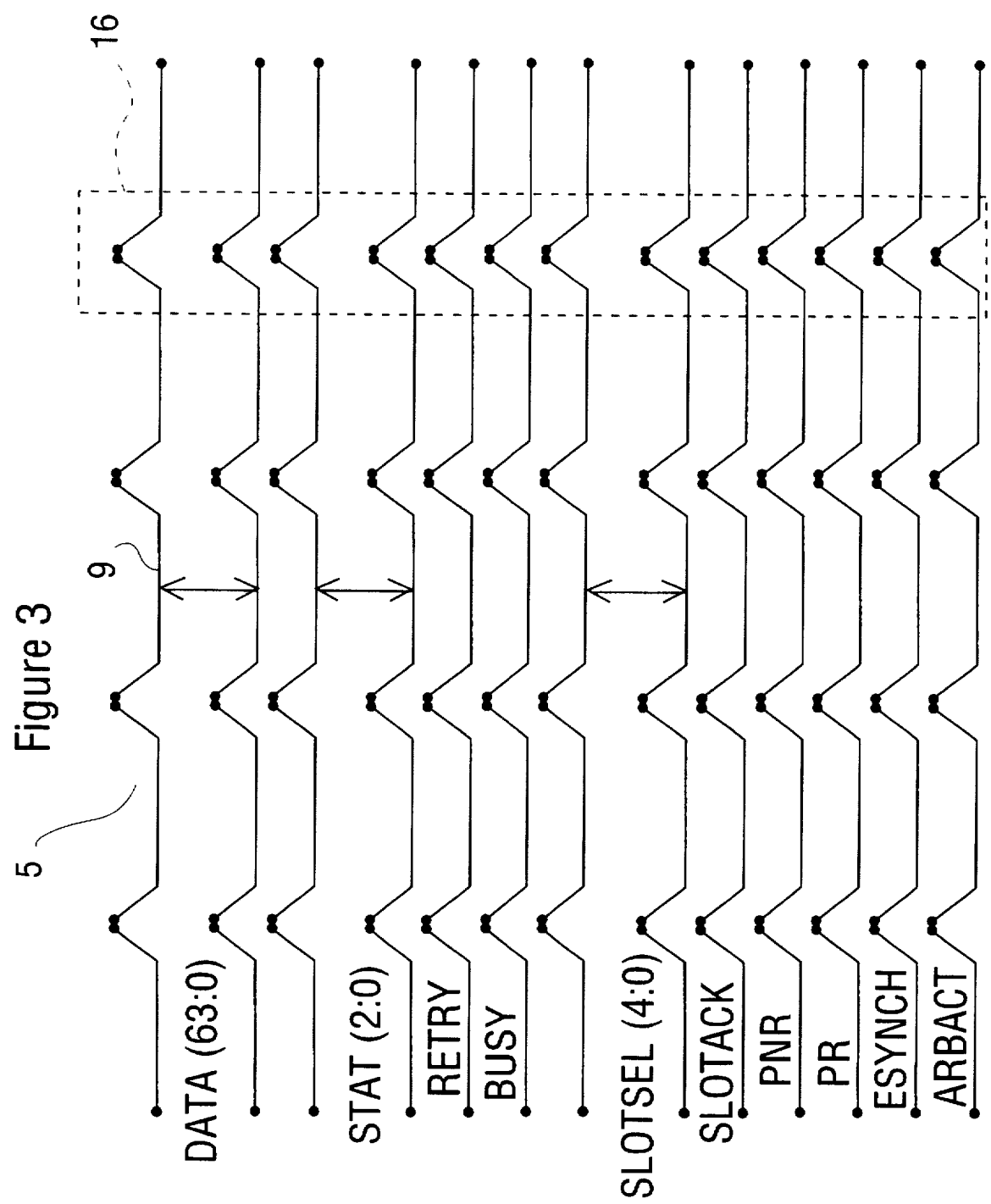
FIG. 3 is a schematic view of the lines of a backplane of the concentrator of the present invention.
Figure 4:
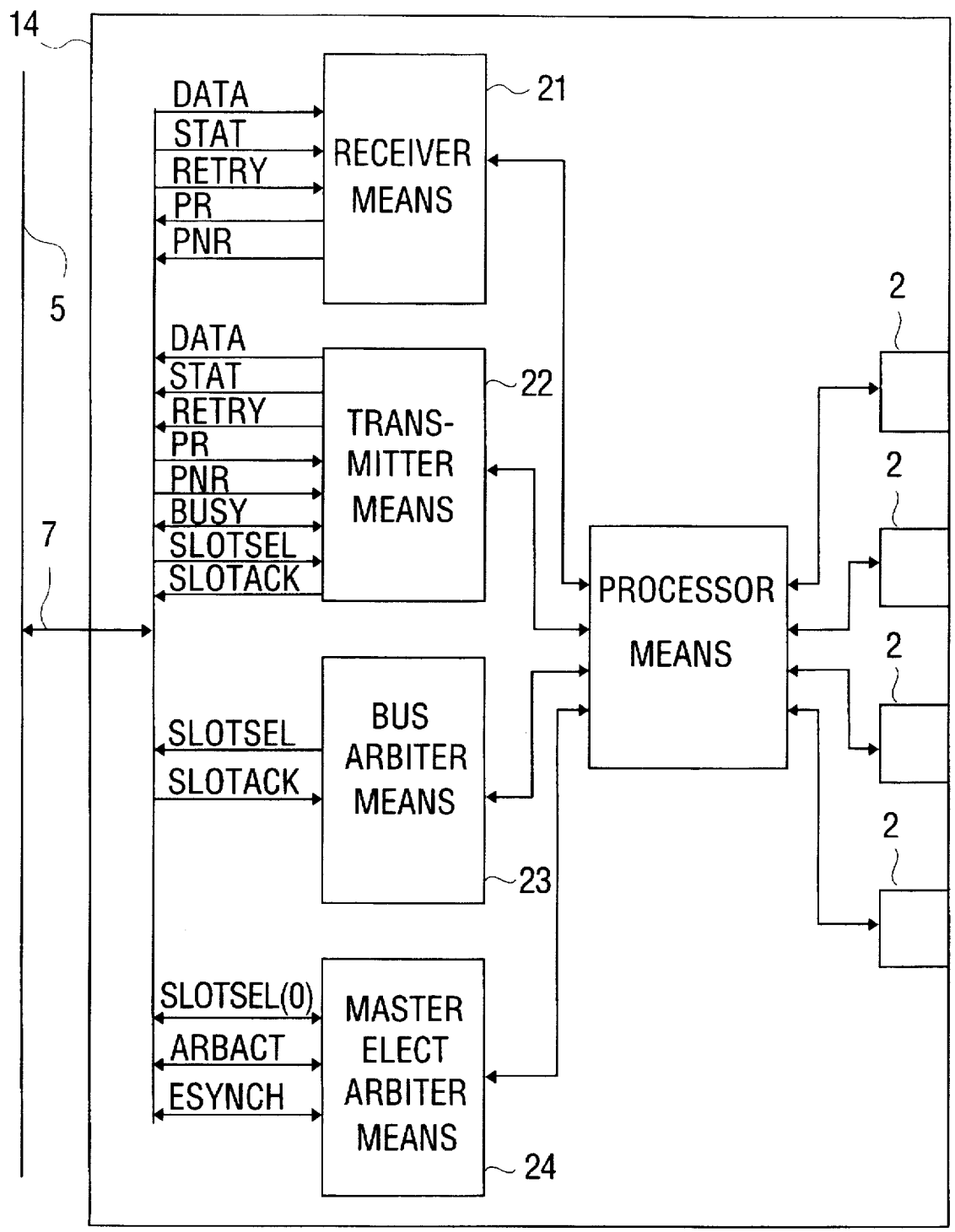
FIG. 4 is a schematic diagram of a module.

FIG. 3 shows the individual signal lines (communication paths) 9 that together form the backplane bus 5. In the preferred embodiment, there are a total of 79 signal lines 9. These 79 signal lines 9 can be organized into the following groups of signals.

DATA(63:0)
STAT(2:0)
RETRY
BUSY
SLOTSEL(4:0)
SLOTACK
PNR
PR
ESYNCH
ARBACT

The DATA group of signal lines is 64 lines wide. The actual data is transferred synchronously over all 64 lines at a rate of, for example 32, MHz. Data can be transmitted in bursts of a single packet. Provisions are available for multiple packet transfers in a single arbitration cycle. The first data transfer of each burst is the 64 bit header. The contents of the packet header are described later. Subsequent transfers contain the packet data.

The STAT signals are three lines wide and the signal on these lines indicate the status of the bus transfer. There are 6 different types of values or signals that these lines can generate. The actual signals generated on the backplane are listed below. After being received by a BTL (backplane transistor logic) receiver on the module, the bit on each line will be inverted in order to be compatible with the BTL. The status bit assignment on each STAT signal line represents the STAT signals as follows:

| Status Line Bits | Definition |
| --- | --- |
| 0 0 0 | End of Cycle |
| 0 0 1 | Cycle Abort |
| 0 1 0 | Data Cycle |
| 1 0 1 | Header Cycle |
| 1 0 0 | Header Cycle with Chaining |
| 1 1 1 | (inactive)Bus Idle |

It should be noted that the backplane is preferably configured as an open collector. Thus, in the absence of any module driving these signal lines low, the bus will default to the "Bus Idle" state.

A RETRY signal is selectively asserted by the transmitting module during transfer of the header onto a RETRY signal line. It is an indication by the transmitter that the packet being sent over the bus has already been sent and this present transmission is only a retry. The reason for the retry can be that on a previous transmission, at least one of the destination modules did not receive the packet due to not having a buffer available. If this is a last retry, i.e. the module has reached its limit of retries, then the RETRY signal is extended one extra clock cycle. This is done so that a receiver can keep statistics on dropped packets due to the buffer of the receiver being full.

If the number of retries is pre-programmed to be zero, then the first transfer is also the last. In this case the RETRY signal is not active during the header cycle but it is asserted during the next cycle indicating that there will be no re-transmits.

A BUSY signal is asserted by a module onto the BUSY signal line while the module is transmitting data onto the DATA signal lines. Upon completion of the arbitration to decide which module transmits for the next cycle before the current data transfer is complete, the BUSY signal is asserted onto the BUSY line as soon as the next transmitter notes a de-asserted or removed BUSY signal from the previous module. In the case where the bus is idle when a module receives the right to take the bus, the BUSY signal is asserted as soon the slot or module sees its Slot Select Address. This BUSY signal remains active for the duration of the data transfer and is de-asserted for the last three bus data cycles in the packet.

SLOTSEL (Slot Select) signals are driven onto the corresponding signal lines by the active arbiter and indicate which slot or module in that slot can claim the bus next. The arbiter preferably asserts these SLOTSEL signals in a 'round robin' fashion, only selecting slots that have a module populated in, or inserted into, the slot. The SLOTSEL(4:0) lines are used in conjunction with the SLOTACK signal to arbitrate successive bus masters. Preferably the SLOTSEL signals indicate the individual modules by transmitting the slot ID of the slot that the module is plugged into. A management bus keeps track of which slots contain modules and informs the modules of their slot ID.

The Slot ID is a five bit field used to uniquely identify each of the 17 slots in the preferred embodiment. On the module, the Slot ID is defined to be five bit binary codes for the numbers 0 through 16. Since the BTL drivers invert all signals for the backplane, the Slot ID is seen on the backplane as the one's complement of the numbers 0 through 16.

The SLOTACK (Slot Select Acknowledge) signal is asserted by a module in a slot that is claiming its arbitration slot for data transfer. It must be asserted on the first clock cycle in which the module of a slot sees its address on the Slot Select lines. By the time the active arbiter sees this signal, it has already incremented the address signal on the Slot Select lines to the address of the next slot in the sequence. In response to the SLOTACK signal the arbiter will freeze the Slot Select lines at this point. The SLOTACK signal is de-asserted by a module at the same time that the module in a slot acquires the bus and asserts the BUSY signal. In the case where the module in a slot sees its Slot Select address appear and the bus is idle, the module in the slot will assert the BUSY signal to claim the bus and will not assert the SLOTACK signal to freeze the arbiter. In all cases, if the module in a selected slot has no data to transmit, it will not assert the SLOTACK signal. A module seeing its address on the slot select lines and seeing the SLOTACK signal asserted will not also try to assert SLOTACK, but instead will wait until SLOTACK is de-asserted.

The PNR (Port Not Ready) signal is asserted by a destination module of a data transfer. If a transfer is being made to a module in a slot and the module does not have a buffer available, the module will assert the PNR signal during the third data cycle of the bus transfer. This indicates to the bus master, which is the module that is presently transmitting, that not all destination modules have received the packet and the packet should be retransmitted.

The PR (Port Ready) signal is asserted by the destination module of a data transfer if the destination module is present and capable of receiving data. This is generally the inverse of the PNR signal and is beneficially used in the case of a multicast or broadcast message where both the PNR and PR signals can be active. The PR signal is asserted during the third data cycle, (fourth overall cycle), of the bus transfer and remains asserted until the last data word of the packet is received. Further explanation is provided below with regard to multicast operation.

The ESYNCH (Election Synchronization) signal is used by the arbiter portion of the modules to elect a master active arbiter. The ESYNCH signal goes active during the initiation of the election process and goes away when all potential arbiters are in synch for the election process. When each of the potential arbiters sees this signal asserted on the corresponding signal line, they respond by also asserting the signal, and then waiting for a pre-determined amount of time before de-asserting it.

The ARBACT (Arbiter Active) signal is used by the arbiters to indicate that one of the arbiters is establishing itself as the active arbiter. This indicates the end of the election process. If this signal goes away for some reason, such as the module of the active arbiter is removed, then the remaining arbiters must initiate an election process by asserting the ESYNCH signal.

Mode of Operation

The first event that takes place in the operation of the bus is the election of the active arbiter. This is done using the ESYNCH, ARBACT and SLOTSEL signals. After the arbiter election is complete the active arbiter begins a, preferably round robin, bus arbitration. During bus arbitration, the Bus Arbiter Means 23 of the module containing the active arbiter communicates with the Transmitter Means 22 of all modules (including its own) via SLOTSEL and SLOTACK. The bus arbiter means 23 drives a Slot ID on the SLOTSEL(4:0) lines and looks for a SLOTACK signal. If the module in the selected slot wants to gain mastership of the bus, this module has a Transmitter Means 22 which activates the SLOTACK signal and the active arbiter holds the SLOTSEL lines with the Slot ID of the next slot in the round robin cycle. Once a Transmitter Means 22 of a module in a slot has asserted SLOTACK and claimed the next available bus cycle, it must wait until the previous Bus Master has completed its data transmission. When the Transmitter Means 22 of a module has been granted the bus, it monitors BUSY. When BUSY is de-asserted it asserts BUSY and communicates with the Receiver Means 21 of one or more modules via DATA, STAT, RETRY, PR, and PNR. When the BUSY signal is de-asserted by the previous Bus Master, the Transmitter Means 22 of the module asserting SLOTACK can now become Bus Master by de-asserting SLOTACK, asserting BUSY and beginning to transfer data over the backplane using the DATA signal lines. At the end of the cycle, the Transmitter Means 22 releases the BUSY signal and allows the module in the next arbitrated and acknowledged slot to gain mastership of the bus. If a Transmitter Means 22 in a slot sees its Slot ID on the SLOTSEL lines and neither SLOTACK nor BUSY are asserted, then the Transmitter Means does not assert SLOTACK but it asserts BUSY and assumes control of the bus immediately. The arbiter is then free to increment the SLOTSEL lines and arbitrate for the next Bus Master.

Arbiter election takes place as follows. Each module has a Master Elect Arbiter means 24 for receiving, processing and generating signals which elect an active Master Elect Arbiter. The Master Elect Arbiter Means 24 of each module communicates with the Master Elect Arbiter Means of all other modules via SLOTSEL (0), ARBACT, and ESYNCH to elect the master arbiter. If there is no active Master Elect Arbiter (i.e. the ARBACT signal is not active) then all the Master Elect Arbiter means 13 must activate the ESYNCH signal. Each Master Elect Arbiter means 13 keeps the ESYNCH active for some period of time, preferably specified to be a minimum of eight clock cycles. This guarantees that all Master Elect Arbiter means 13 have seen that no Master Elect Arbiter is active. If for some reason an active Master Elect Arbiter sees the ESYNCH signal asserted, its Master Elect Arbiter means 13 must de-assert its ARBACT signal, assert the ESYNCH signal and join in on a new master arbitration election. After the eight clock cycle minimum, the Master Elect Arbiter means 13 begin releasing the ESYNCH signal. Each one may release it at a different time or they may all release it together. All the Master Elect Arbiter means 13 monitor the ESYNCH signal and when the last Master Elect Arbiter means 13 de-asserts its ESYNCH, the ESYNCH line becomes de-asserted. All the Master Elect Arbiter means are connected to the ESYNCH line in a wired-OR manner so that if any Master Elect Arbiter means transmits an ESYNCH signal, the signal is present.

On the clock cycle that the ESYNCH SIGNAL is de-asserted, the arbitration process begins. The arbitration process is how all the Master Elect Arbiter means 13 get synchronized. Each Master Elect Arbiter means 13 then asserts the most significant bit of its Master Elect Arbiter Version Field onto the SLOTSEL (bit 0) signal line and holds it there for five clock cycles. The SLOTSEL (bit 0) line therefore has two purposes which are separate and occur at different times. The backplane bus 5 is configured so that one logic level, a one (1) or zero (0), is dominant. If two or more modules try to place different logic levels on a signal line, only the dominant logic level will prevail, i.e. logic level zero. If an Master Elect Arbiter means 13 observes the opposite logic level coming back on this signal line then this module drops out of the election process. If an Master Elect Arbiter means 13 sees the same logic level that it is driving on the backplane then this Master Elect Arbiter means 13 continues placing the next bit of its Arbiter Version Field and slot ID onto SLOTSEL (bit 0). At the end of the eight bit transmission (3 bits for the Master Elect Arbiter Version Field followed by 5 bits of Slot ID) from most significant bit (MSB) to least significant bit (LSB) only one Master Elect Arbiter means or module will remain and it should activate the ARBACT signal.

Note that each of the eight "bit cycles" consists of five 32 MHz clock cycles. On the first clock cycle after the Master Elect Arbiter means 13 sees ESYNCH released, it asserts the most significant bit of its Master Elect Arbiter Version Field. On the second clock cycle this bit is clocked onto the backplane. On the third clock cycle this bit is clocked back onto each of the modules for verification.

The individual Master Elect Arbiter means then wait until the fifth clock cycle to sample this bit and make a decision to drop out or to assert its next most significant Master Elect Arbiter Version bit. When an Master Elect Arbiter means drops out of the election process, it drives a 'zero' into the BTL driver which results in driving a 'one' onto the backplane which is effectively passive in an open collector system.

When the eight "bit cycles" have completed, the remaining Master Elect Arbiter means asserts the ARBACT signal and activates the Bus Arbiter on the respective module. All the remaining Master Elect Arbiters monitor the ARBACT signal to make sure that one Bus Arbiter means or module was elected and is now the active Bus Arbiter. If the ARBACT signal does not get asserted, within eight clock cycles of the end of a completed arbitration process, a Master Elect Arbiter means in standby will assert the ESYNCH signal which will start another arbitration cycle. At any time, if a Master Elect Arbiter means sees the ESYNCH signal go active, it means that an election is to take place regardless of whether or not there is currently an active Bus Arbiter. The other state machines must also recognize that the current data transfer (if there is one) is to be terminated. This is essentially a BUS RESET signal.

The active Bus Arbiter, once elected, performs a preferably round robin arbitration of all the modules present in the system to manage bus mastership and indicate when each module can transmit over the backplane. The arbitration mechanism is designed however to use different arbitration processes if desired. As soon as the active Bus Arbiter becomes active and asserts the ARBACT signal, the active Bus Arbiter also drives the Slot ID of a first module on the SLOTSEL lines. The Bus Arbiter holds the Slot ID there for three clock cycles and then increments the Slot ID to the next slot in the round robin chain. It then holds this Slot ID active for three clock cycles. If the module in the first slot had a packet ready to transmit when it first observed its Slot ID and the BUSY signal was asserted, it would have asserted SLOTACK on the next clock cycle. The SLOTACK signal would then make it back to the Bus Arbiter on the third clock cycle of broadcasting the second Slot ID. If the Bus Arbiter sees SLOTACK asserted, it does not increment the SLOT-SEL lines to the third slot. From this point forward, the Bus Arbiter increments the Slot ID whenever SLOTACK is not active and the current Slot ID has been broadcast for a duration of three clock cycles. Note that whenever a module in a slot asserts SLOTACK and claims the next available bus mastership, the Bus Arbiter is held pointing to the next slot in the sequence. The next module will not assert its SLOTACK until it sees the current slot release it.

A Transmitter means of a module in a slot can only assert its SLOTACK signal on the first cycle in which it sees its Slot ID on the SLOTSEL lines and the SLOTACK signal not asserted. If it misses this opportunity (a packet doesn't arrive from a workstation to the module until the second or third cycle) then it must wait for the Bus Arbiter to complete a round robin cycle of all the present modules and for the active Bus Arbiter to come back to the module. To implement this, a transmit state machine of a module must track both the current state of the SLOTACK and SLOTSEL signals as well as the previous state of these signals. One artifact of looking for transitions on these signals is that upon start-up, immediately after master arbitration election, Slot 0 will not get the first opportunity for transmitting a packet since no transition would have been seen. When the Bus Arbiter increments to Slot 1, the module in Slot 1 will get the first opportunity to transmit a packet.

Once a module asserts the SLOTACK signal, it has reserved the next cycle on the bus. It monitors the BUSY signal to see when the current bus master is ready to release the bus. On the first clock cycle that it sees BUSY de-asserted, it re-asserts BUSY, assumes mastership of the bus, and de-asserts SLOTACK to allow for the Bus Arbiter to begin the selection of the next bus master. Note, that BUSY is actually de-asserted by the current bus master during the last three clock cycles of the data transfer. Due to the pipelining of the control signals, the new bus master can assume control of the bus immediately and still not overlap the previous data cycle.

In the case where a module in a slot sees its Slot ID appear on the SLOTSEL lines and not only is SLOTACK not asserted but the bus is idle and BUSY is not asserted, the module in the slot will assert BUSY, assume mastership of the bus immediately and it will not assert SLOTACK. The Bus Arbiter will proceed on with arbitration for the next bus cycle.

In the same cycle that the bus master gains access to the bus with the BUSY signal it can begin data transfer. The bus master puts the header on the DATA lines and the "Header Cycle" signal or encoding on the STAT(2:0) lines. The format of this header is described later. If the master is not ready to transmit the header on the first clock cycle in which it asserts BUSY, it can put the "Bus Idle" signal or encoding on the STAT(2:0) lines until it is ready. Note that if the bus is not driven at all, the STAT lines will "float" to the "Bus Idle" state. After the header, data is transferred every clock cycle until the packet is complete. While the data is being transmitted, the STAT(2:0) lines are driven with the 'Data Cycle" encoding or signal. During the last three transfers of a data packet, the BUSY signal is de-asserted and the STAT(2:0) lines are driven to the "End of Cycle" values. This permits the next bus master to make preparations to drive its header onto the bus with potentially no idle cycles in between transfers.

It should be noted that there is a provision for a slot to transmit more than one packet when it assumes control of the bus. This is called data transfer with chaining. To do this the slot should transmit the "Header Cycle with Chaining" encoding or signalling on the STAT(2:0) lines during the header cycle of each packet until the header cycle of the last packet in the packet chain. Also, the slot must not de-assert BUSY until three cycles before the end of the last packet.

When a module in a slot receives a multicast header, which is sent by a module to a plurality of recipients, it checks to see if the module is one of the intended recipients. If the slot is to receive the packet and it has a buffer ready in which to store the packet, then the slot asserts the PR (port ready) signal for the duration of the packet. If the slot is to receive the packet and it does not have a buffer ready in which to store the packet, then it asserts the PNR (port not ready) signal for one cycle. In either case the module is expected to assert PR or PNR during the first data cycle after it has received the header. The signal will be clocked onto the backplane during the second data cycle, and will be clocked into the bus master during the third data cycle. If the bus master sees the signal PNR asserted and no other module is asserting PR then the transfer is aborted with a "Cycle Abort" signal on the STATUS lines. This indicates that the transfer is incomplete and should be retried. If the bus master sees the both the PR and PNR signals asserted then it completes the data transfer as usual, asserts the "End of Cycle" signal during the last three data transfers, but it holds onto the packet for retransmission. If neither PR nor PNR are asserted, then the packet is dropped and not retried.

When a packet needs to be transmitted to more than one slot, the destination slot mask in the header will have more than one bit set. On the first transfer, the RETRY signal is not asserted. If a receiving module can receive the packet, it asserts the PR (port ready) signal. If it does not have the buffer space available, it asserts the PNR (port not ready) signal. If the transmitter sees the PR signal asserted it transfers the entire packet and all the slots that received it set a bit to indicate that they received the last packet from the transmitting slot. Every module must keep a 17 bit register means to store this state.

The Retry Slot Mask register contains one bit for each slot. The register is reset to all zeros upon initialization or when a reset command is issued. When a bit in the register of a module is equal to one, say bit N, it indicates that a packet was sent to this module by a corresponding transmitting module in slot N, and the receiving module was not able to copy the packet due to lack of buffer space. When a receiving module sees a packet on the bus from a transmitting module in slot N, it determines if it has copied this packet previously. If the RETRY bus signal is not asserted during the header cycle, indicating that this is a new rather than a retried packet, OR if bit N of the Retry Slot Mask register is equal to one, then the packet has not been copied previously by this module. When a module sees a packet on the bus from a module in slot N that it has not previously copied, it will check to see if it has buffer space available for the packet. If it has buffer space available it will assert the signal PR, copy the packet, and write a zero to bit N of the Retry Slot Mask register. If it does not have buffer space available it will assert the signal PNR and write a one to bit N of the Retry Slot Mask register. In all other cases, the Retry Slot Mask register bits remain unchanged. If a receiving module sees a packet for itself with a retry signal, it will check the register for the transmitting module. If the register has a one then this means that the last packet was not received and the receiving module will try to copy the packet.

If any slot asserts the PNR signal, the transmitter will save the packet and retransmit it on its next arbitrated cycle, this time with the RETRY signal asserted during the "Header Cycle".

On the receiving side, when the RETRY signal is seen, the module looks to see if it already received the packet from that slot. If the module did receive the packet then the module ignores the transfer. If the module didn't receive the packet, then the module tries to copy the packet and asserts the PR or PNR signal as appropriate. This continues until all slots have received the packet or the maximum number of retries has been reached. The transmitter will know that all slots have received the packet when on its final retransmission, no module asserts the PNR signal.

Each module will have a mechanism to limit the maximum number of times to retry a packet before discarding it. The maximum number can be determined by the module, independent of the bus specification, and should be programmable. The module should also maintain a counter to track the number of packets that it was forced to discard as a result of hitting the maximum retry limit.

When the module has reached its retry limit and is transmitting the packet over the bus for the last time, (regardless of state of the PR and PNR signals), it will assert the RETRY signal as always during the Header frame but this time it will hold the RETRY signal asserted for one additional clock cycle. If the receiving module still cannot receive the packet, it will use this "last retry" information to maintain a counter to track the number of packets it dropped due to not having an available receive buffer.

The maximum retry limit for a transmitting module can be a programmable feature on the module. If this value is programmed to zero, then all packets are transmitted only once. In this case, the RETRY signal is not asserted during the Header frame but is always asserted during the frame following the Header.

The present invention also has means for accommodating high-speed and low-speed modules. Both high and low-speed modules can be incorporated into the same concentrator system of the present invention and the high and low-speed modules can communicate with each other. In this dual speed operation, the high-speed transfers one 64 bit word of data each clock cycle during packet transmission. Slow speed transfers one 64 bit word of data every two clock cycles during packet transmission. Each module is programmed by a management process with information as to which modules are high-speed and which modules are low-speed. High-speed modules are capable of transmitting and receiving data at both high-speed and low-speed. Low-speed modules only transmit and receive at low-speed. When a high-speed module has a packet to transmit, it checks to see if any destination modules are low-speed. If so, it sets a bit in the packet header to indicate low-speed transmission and transfers the header and data at a rate of one word every two clock cycles. If all the destination modules are high-speed, the transmitting module sets this speed bit to indicate high-speed transmission. The transmitting module transfers the header for two clock cycles, since all modules must read the header. The transmitting modules then transfers the remainder of the packet at a rate of one word every clock cycle. Low-speed modules always set the header bit to indicate low-speed transmission and transmit header and data at the rate of one word every two clock cycles.

The first data always transferred over the backplane is a 64-bit header. This is followed by the rest of the packet 64 bits at a time. Each block of 64 bits is on the bus for one 32 MHz clock cycle. The BUS packet header is a 64-bit structure and is shown in FIGS. 5 and 6. The four bit header parity field contains four separate odd parity computations based on the remaining 60 bits in the header. Bit 0 of the header parity field is computed by taking the inverse of the exclusive NOR (XNOR) of bits 4, 8, 12, 16, 20, 24, 28, 32, 36, 40, 44, 48, 52, 56, and 60. Bit 1 of the header parity is computed using bits (1+4N) of the packet header where N is an integer from 1 to 15. Similarly, Bit 2 is computed using bits (2+4N) and Bit 3 is computed using bits (3+4N) over the same range of N.

An Ethernet/802.3 Packet Format and an FDDI Packet Format are shown in FIGS. 7 and 8 respectively.

Figure 9:
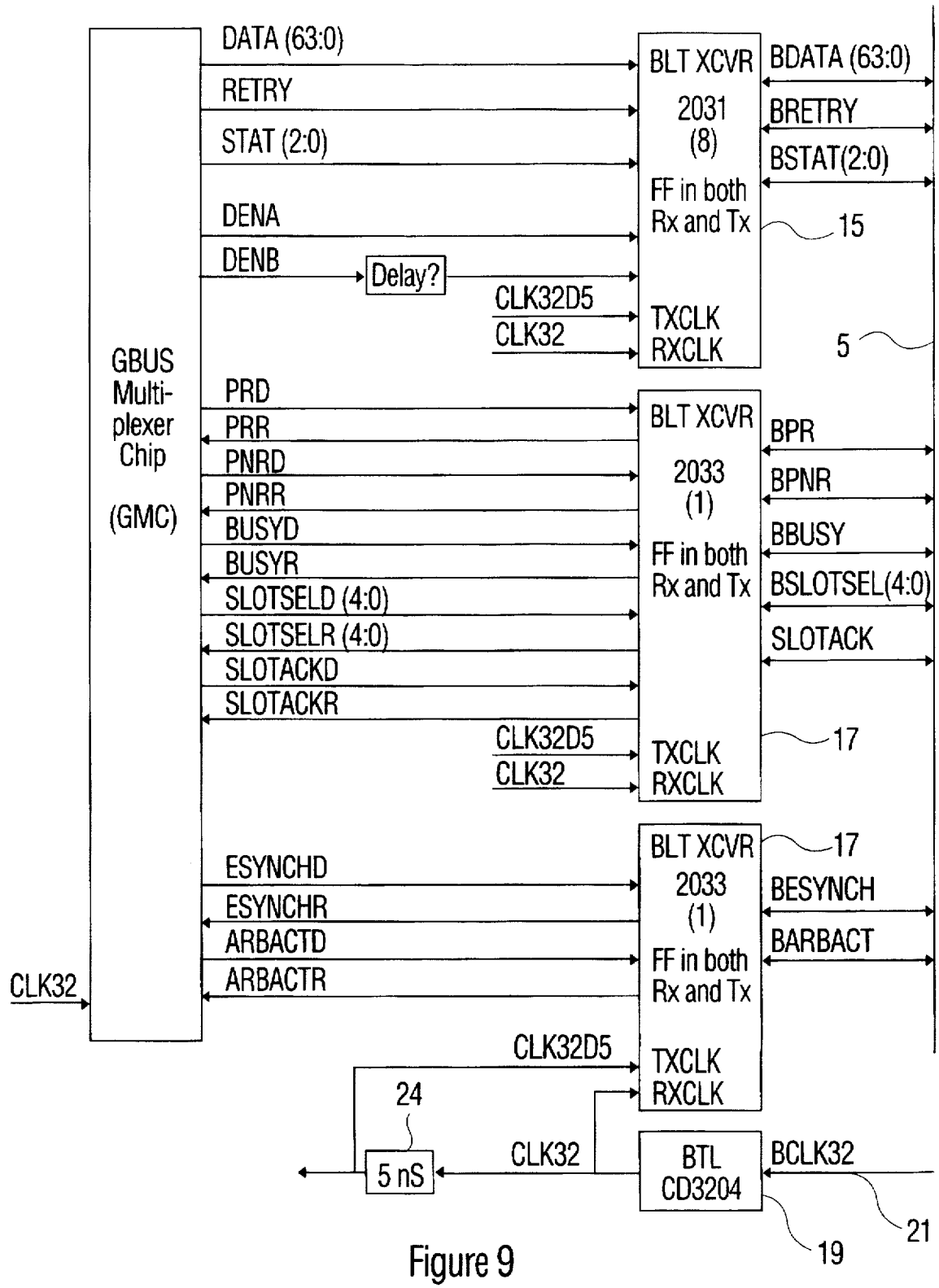
FIG. 9 is a schematic diagram of the bus interface of the present invention.

FIG. 9 is a schematic diagram of the bus interface. All the slots in the concentrator in addition receive a 32 MHz BTL clock signal 21 from the backplane. This clock signal 21 is sourced at the center of the backplane by the hub's controller card and driven to both ends of the backplane where it is preferably terminated with 33 ohms. Each module receives this BTL clock signal 21 and creates a 5 nS, nominal, delayed version of it. All data, control, and arbitration signals are clocked onto the bus from a FB2031 or FB2033 BTL transceiver 15, 17 using the delayed version of the 32 MHz clock. All of these signals are subsequently clocked off of the bus with FB2031 or FB2033 BTL transceivers 15, 17 using the undelayed 32 MHz clock. The reason for clocking data onto the bus with the delayed clock is to guarantee hold time for the data from the previous cycle.

The critical components in the timing analysis of the Bus are the backplane itself, the CD3204 BTL transceiver 19 used to buffer the 32 MHz clock from the backplane, the 5nS delay line 24, and the timing characteristics of the FB2031/FB2033 transceivers 15, 17. The DATA(64:0), STAT(2:0), and RETRY signal lines all use the FB2031 devices 15 and the remaining control signal lines use the FB2033 devices 17. Since the timing characteristics for these two components 15, 17 are specified slightly differently by the vendors, it is necessary to calculate worst case timing for these two sets of signals separately. FIG. 10 is spreadsheet presenting this analysis.

FIGS. 11–15 depict sample transactions over the bus. Each signal name ending with the suffix character 'D' shows the state of that signal on the transmitting board at the output of the GMC ASIC/input to the bus transceivers. Each signal name ending with the suffix character 'B' shows the state of that signal on the backplane and each signal name ending with the suffix character 'R' shows the state of that signal on the receiving module at the output of the bus transceiver/input to the GMC chip. By showing the state of the signal at all three stages the figures clarify the three step pipelining process involved in all bus transactions.

Figure 11:
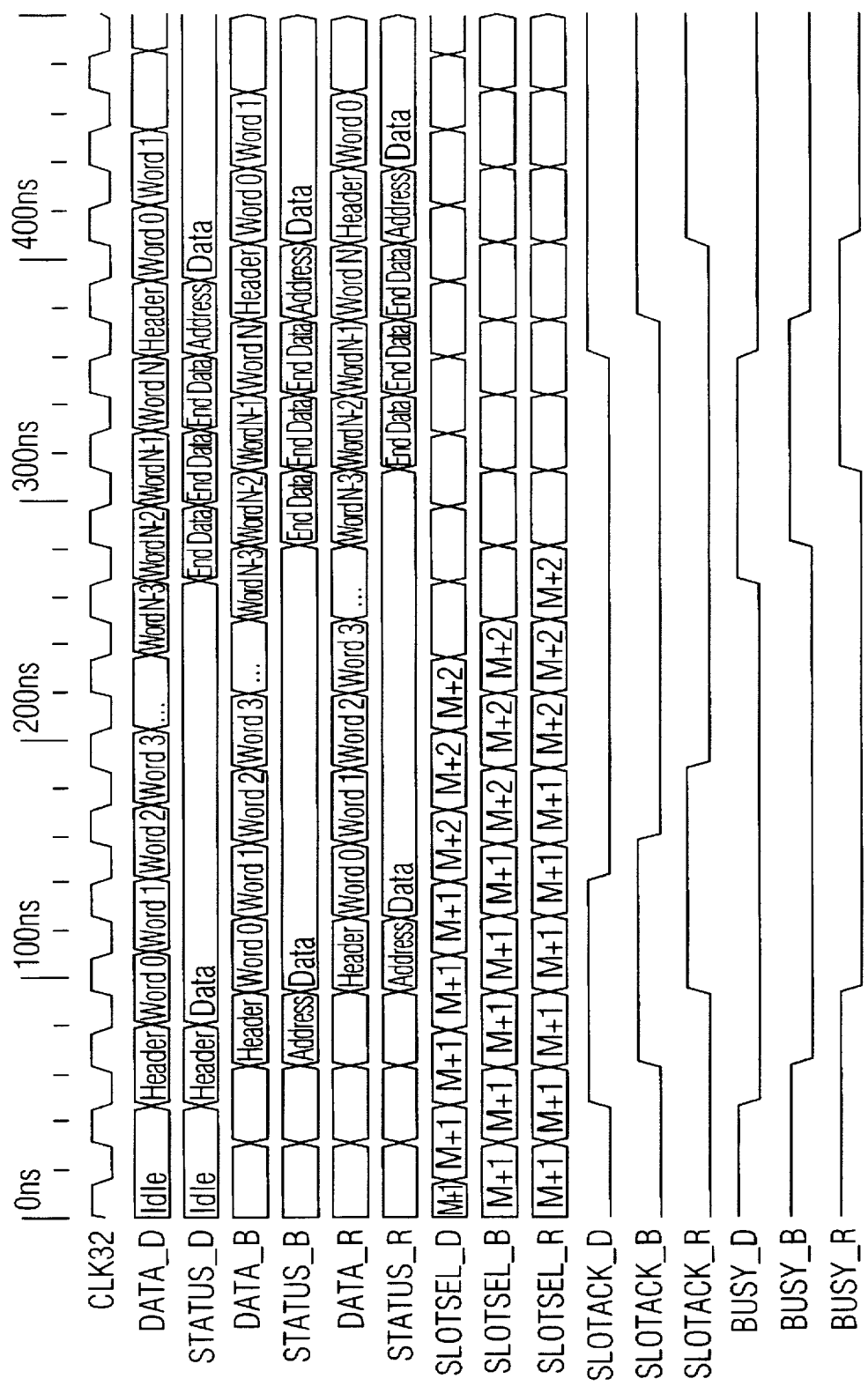
FIGS. 11-15 are a series of diagrams using ideal timing for the operation of the present invention.

In FIG. 11, a bus transaction is shown in which a module in Slot M begins transmitting and relinquishes the bus arbitration token by de-asserting SLOTACK. The module in Slot M+1 claims the arbitration token by asserting SLOTACK and awaits its turn to transmit.

Figure 12:
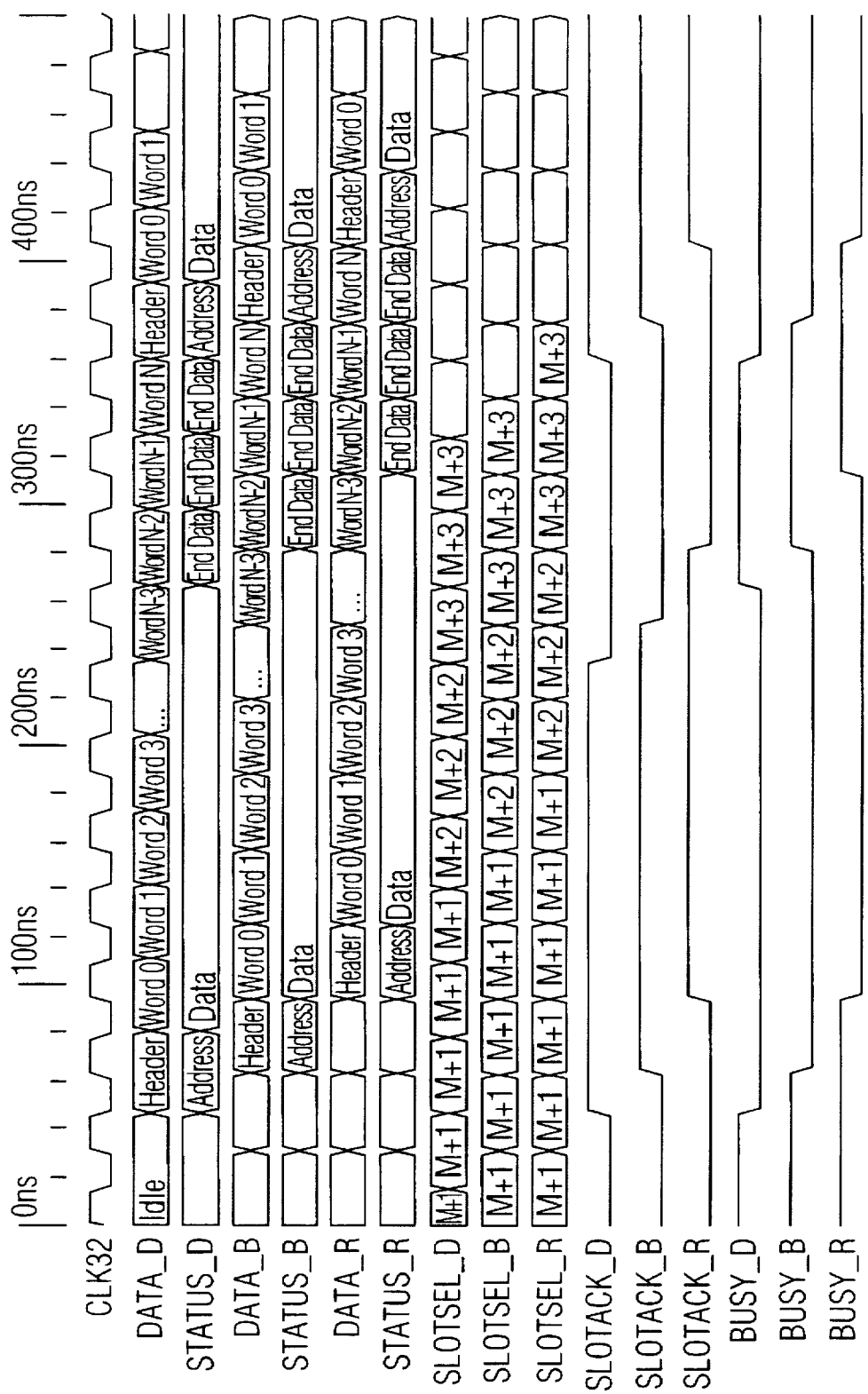

In FIG. 12, a bus transaction is shown in which a module in Slot M begins transmitting and relinquishes the bus arbitration token by de-asserting SLOTACK. The module in Slot M+1 does not have any data to transmit and allows the arbitration to pass. The module in Slot M+2 claims the arbitration token by asserting SLOTACK and awaits its turn to transmit.

Figure 13:
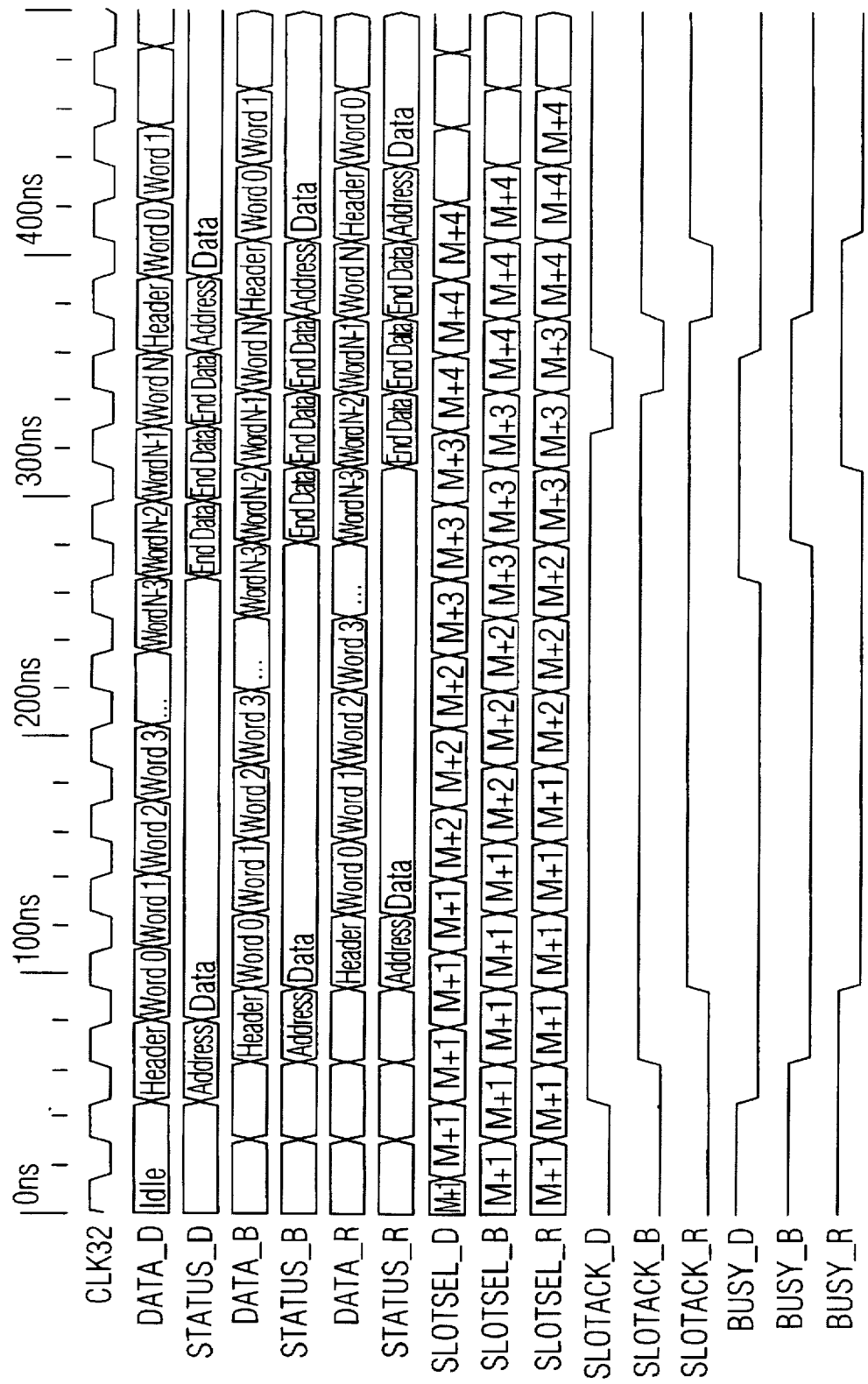

In FIG. 13, a bus transaction is shown in which a module in Slot M begins transmitting and relinquishes the bus arbitration token by de-asserting SLOTACK. The module in Slot M+1 does not have any data to transmit and allows the arbitration to pass. The module in Slot M+2 does not have any data to transmit and allows the arbitration to pass. The module in Slot M+3 claims the arbitration token by asserting SLOTACK and since it sees the bus become available on the next cycle (module M de-asserts BUSY), module M+3 begin transmitting on the bus.

Figure 14:
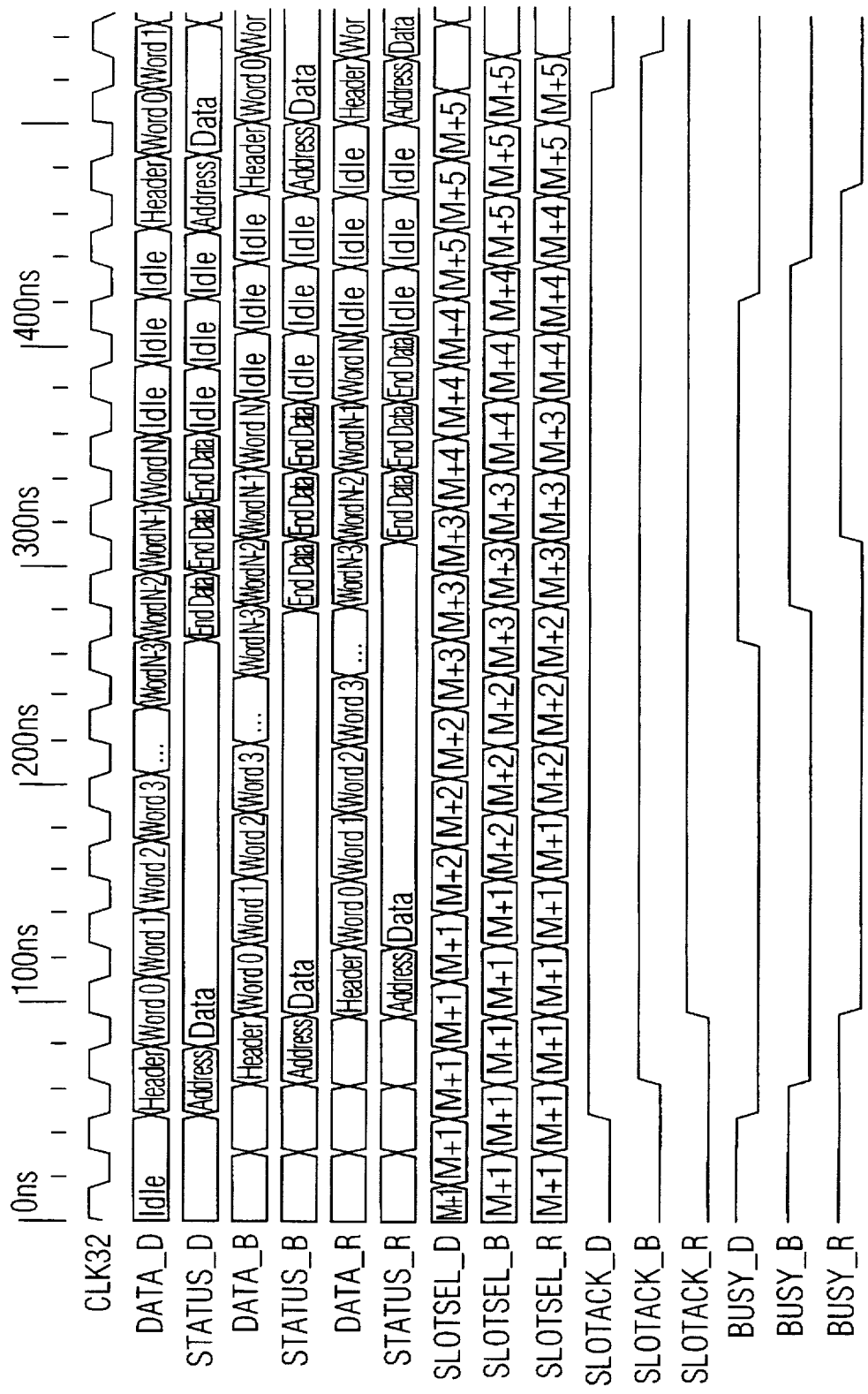

In FIG. 14, a bus transaction is shown in which a module in Slot M begins transmitting and relinquishes the bus arbitration token by de-asserting SLOTACK. The module in Slot M+1 does not have any data to transmit and allows the arbitration to pass. The module in Slot M+2 does not have any data to transmit and allows the arbitration to pass. The module in Slot M+3 does not have any data to transmit and allows the arbitration to pass. By the time the bus arbitration token reaches the module in Slot M+4 the bus is no longer busy with the packet from module M. Since the module in Slot M+4 can claim the bus immediately, it does not need to claim the arbitration token and assert SLOTACK. Instead, it bypasses the token and claims the bus by asserting BUSY. The arbitration will continue on with module M+5 but the next module will not begin transmitting until module M+4 de-asserts BUSY.

Figure 15:
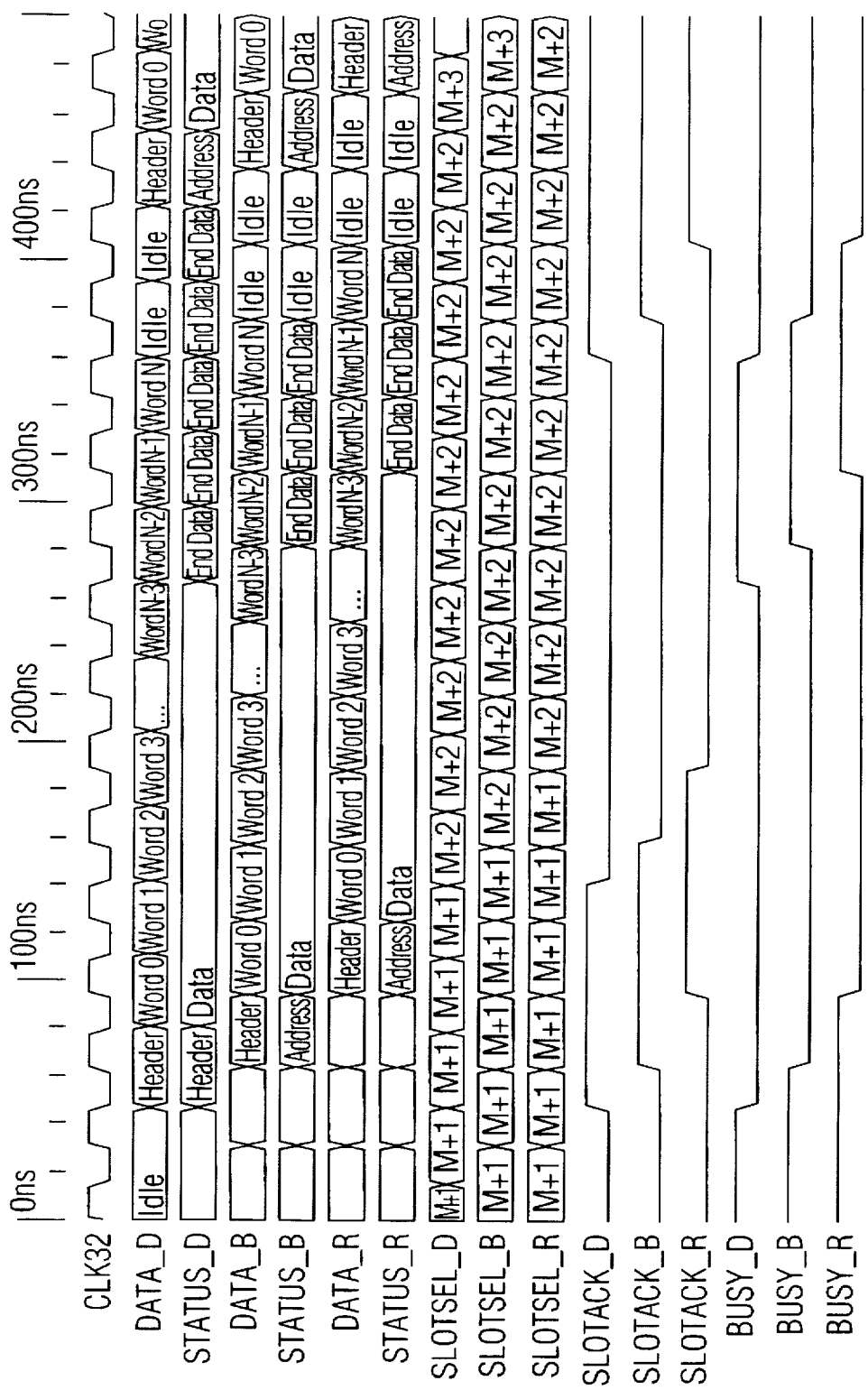

In FIG. 15, a bus transaction is shown in which a module in Slot M is transmitting a packet and the module in Slot M+1 is receiving this packet. Simultaneously, the module in Slot M+1 has claimed the arbitration token by asserting SLOTACK and is awaiting its turn to transmit. This timing diagram shows that due to the pipelining used on the bus, it is not possible for a module to transition from receive to transmit without introducing "idle cycles" on the bus. This is the only case where idle cycles are necessary and the figure shows that only two clock cycles are unutilized between the packets.

There can be several versions of backplanes designed to support the operation of the present invention. These can include dual-purpose backplanes designed to support both modules of the present invention and other modules such as the IBM UNI-switch ATM blades. In one 17 slot version of a combined "ATM/Packet Bus", bus operation of the present invention is limited to Slots 1–8 and Slots 13–17. In the 10 slot version of the combined backplane, bus operation of the present invention will be limited to Slots 1–8. There are also versions of both the 17 and 10 slot backplanes where all the slots are compatible with the present invention.

Two pins on the backplane have been designated for use by the module to determine whether or not the backplane of the present invention is present in the Oncore chassis, and if so, what type of function is supported by the slot.

| C-18 | C-60 |
| --- | --- |
| Slots 1 to 8 | gnd | open |
| Slots 13 to 17 | | |
| Slots 9 to 12 | gnd | gnd |

Each module should connect pull-up resistors to backplane pins C-18 and C-60 and monitor the voltage at these pins. If a high logic level is seen at pin C-18 then it can be assumed that there is no third backplane present in the system. If a low logic level is seen at pin C-60 then it can be assumed that a combined "ATM/Packet Backplane" is present and that the current slot does not support Gbus operation. If a low logic level is seen on C-18 and a high logic level is seen on pin C-60 then it can be assumed that this slot supports Gbus operation. It is a requirement of all future Gbus backplanes including the 'Packet Only" only versions that pins C-18 and C-60 are configured appropriately.

While specific embodiments of the invention have been shown and described in detail to illustrate the application of the principles of the invention, it will be understood that the invention may be embodied otherwise without departing from such principles.

What is claimed is:

1. A computer network concentrator system, comprising:

a backplane with a DATA line, a BUSY line parallel with said DATA line and a SLOTSEL line parallel with said DATA line;

a plurality of modules connected to said DATA, BUSY, and SLOTSEL lines, each of said plurality of modules having a unique slot ID, said SLOTSEL line being capable of transmitting any one of said unique slot ID's, one of said plurality of modules being an active arbitration module and having a Bus Arbiter means for selecting which of said plurality of modules will transmit data onto said DATA line, said Bus Arbiter means transmitting said unique slot ID of one of said modules onto said SLOTSEL line;

each of said plurality of modules including a Transmitter means for monitoring said SLOTSEL line for a respective unique slot ID on said SLOTSEL line, monitoring said BUSY line for a BUSY signal, said Transmitter means transmitting a BUSY signal onto said BUSY line and subsequently transmitting a packet onto said DATA line upon said Transmitter means detecting that said BUSY line does not have a BUSY signal, detecting that said SLOTSEL line has said unique slot ID and a detecting that a respective module associated with said Transmitter means has said packet to transmit onto said DATA line.

2. A system in accordance with claim 1, wherein:

said Bus Arbiter means periodically transmits each SLOT ID of said plurality of modules onto said SLOTSEL line.

3. A system in accordance with claim 2, wherein said backplane further comprises a SLOTACK line parallel with said DATA line;

said Transmitter means transmits a SLOTACK signal onto said SLOTACK line if said SLOTSEL line has said respective SLOT ID, said BUSY line has a BUSY signal and said respective module has a packet to transmit onto said DATA line, said Transmitter means removes said SLOTACK signal from said SLOTACK line when said BUSY signal is removed from said BUSY line, said Transmitter means then transmits said BUSY signal onto said BUSY line and transmits said packet onto said data line;

said Bus Arbiter means halting periodic transmitting of said each SLOT ID onto said SLOTSEL line when said SLOTACK signal is on said SLOTACK line.

4. A system in accordance with claim 3, wherein:

said Transmitter means removes said BUSY signal from said BUSY line after said packet has been transmitted onto said DATA line;

said Bus Arbiter means resumes periodically transmitting said each SLOT ID when said SLOTACK signal is removed.

5. A system in accordance with claim 3, wherein:

a CLOCK line is parallel with said DATA line, said clock line maintains a CLOCK signal with a plurality of clock cycles;

said Bus Arbiter means transmits a SLOT ID onto said SLOTSEL line for three of said clock cycles, said Bus Arbiter means then transmits another SLOT ID onto said SLOTSEL line;

when said Transmitter means transmits said SLOTACK signal onto said SLOTACK line, said Transmitter transmits on a second clock cycle after said respective SLOT ID is present on said SLOTSEL line;

said Bus Arbiter means receives said SLOTACK signal from said SLOTACK line on a third clock cycle and does not transmit any further SLOT ID until said SLOTACK signal is removed from said SLOTACK line.

6. A system in accordance with claim 5, wherein:

said Transmitter means removes said BUSY signal from said BUSY line during a last three clock cycles of transmitting of said packet onto said DATA line.

7. A system in accordance with claim 6, wherein:

said Bus Arbiter means and said Transmitter means operate in parallel and synchronous with said transmitting of said packet onto said DATA line.

8. A system in accordance with claim 5, further comprising:

a STAT line parallel with said DATA line, said Transmitter means transmitting a HEADER CYCLE signal onto said STAT line when said Transmitter means transmits a header of said packet onto said DATA line, said Transmitter means transmitting a DATA CYCLE signal onto said STAT line when said Transmitter means transmits a data portion of said packet onto said DATA line, said Transmitter means transmitting an END OF CYCLE signal onto said STAT line when said Transmitter means transmits a last three clock cycles of said data portion onto said DATA line, said STAT line defaults to a BUS IDLE signal when no signals are transmitted onto said STAT LINE.

9. A system in accordance with claim 5, wherein:

an ARBACT line is parallel with said DATA line;
an ESYNCH line is parallel with said DATA line;
said plurality of modules are connected to said ARBACT and ESYNCH lines;
said each of said plurality of modules has Master Elect Arbiter means for electing one of said plurality of modules to be said active arbitration module and disabling all Bus Arbiter means on modules not elected as said active arbitration module, said Master Elect Arbiter means operating in parallel with said DATA line and synchronous with said CLOCK signal.

10. A system in accordance with claim 9, wherein:

a PR (Port Ready) line is parallel with said DATA line;
a PNR (Port Not Ready) line is parallel with said DATA line;
said plurality of modules connect to said PR and PNR lines, each of said Transmitter means transmitting a PR signal onto said PR line if said respective module is properly receiving a packet from said DATA line, each of said Transmitter means transmitting a PNR signal onto said PNR line if said respective module can not properly copy said packet from said DATA line.

11. A system in accordance with claim 3, wherein:

one of said Transmitter means can immediately retransmit said SLOTACK signal onto said SLOTACK line after said one Transmitter means has removed said SLOTACK signal from said SLOTACK line during transmitting of said packet onto said DATA line if no other Transmitter means of other said modules transmit said SLOTACK signal and said Bus Arbiter means again selects said respective SLOT ID of said one Transmitter means.

12. A system in accordance with claim 1, wherein:

said DATA line includes a plurality of transmission paths transmitting data from said packet in parallel;
said SLOTSEL line includes a plurality of transmission paths transmitting said each SLOT ID in parallel.

13. A system in accordance with claim 1, wherein:

said Bus Arbiter means gathers said SLOT ID of each of said plurality of modules and only periodically transmits said SLOT ID of modules connected to said DATA, BUSY and SLOTSEL lines.

14. A management system for a backplane of a computer network, the system comprising:

an ARBACT line;
an ESYNCH line parallel with said ARBACT line;
a SLOTSEL line parallel with said ARBACT line, said SLOTSEL line having a dominant state and a recessive state, said SLOTSEL line maintaining said dominant state when both said dominant and recessive states are transmitted onto said SLOTSEL line;
a plurality of modules connected to said ARBACT, SLOTSEL and ESYNCH lines, each of said plurality of modules having a SLOT ID, each SLOT ID including a plurality of dominant and recessive states, said SLOTSEL line being capable of transmitting said SLOT ID, each of said plurality of modules having Bus Arbiter means for selecting which of said plurality of modules will transmit data onto the backplane, said each of said plurality of modules also having Master Elect Arbiter means for electing one of said plurality of modules to be an active arbitration module and disabling all Bus Arbiter means on modules not elected as said arbitration module, said Master Elect Arbiter means of said active arbitration module transmitting an ARBACT signal onto said ARBACT line, each of said Master Elect Arbiter means transmitting an ESYNCH signal onto said ESYNCH line if said ARBACT signal is missing from said ARBACT line, said each Master Elect Arbiter means removing said ESYNCH signal from said ESYNCH line after a predetermine time period, said each Master Elect Arbiter means transmitting a respective arbiter version field and a respective SLOT ID onto said SLOTSEL line after all ESYNCH signals are removed from said ESYNCH line, said each Master Elect Arbiter means monitoring a state of said SLOTSEL line, if said SLOTSEL line has a state other than a state transmitted by said Master Elect Arbiter means, said Master Elect Arbiter means stops transmitting onto said SLOTSEL line and disables a respective said Bus Arbiter means, a Master Elect Arbiter means still transmitting after all other Master Elect Arbiter means have finished said transmitting of said respective SLOT ID's onto said SLOTSEL line is a remaining Master Elect Arbiter means and transmits said ARBACT signal onto said ARBACT line.

15. A system in accordance with claim 14, wherein:

said each module includes an Arbiter VERSION FIELD, each Arbiter VERSION FIELD including a plurality of dominant and recessive states, said SLOTSEL line being capable of transmitting said VERSION FIELD and said respective SLOT ID, said each Master Elect Arbiter means transmitting said VERSION FIELD and said respective SLOT ID onto said SLOTSEL line after said all ESYNCH signals are removed from said ESYNCH line.

16. A system in accordance with claim 15, wherein:

said VERSION FIELD is programmable for each of said plurality of modules.

17. A system in accordance with claim 14, wherein:

a CLOCK line is parallel with said ARBACT line, said clock line maintains a CLOCK signal with a plurality of clock cycles;

said each Master Elect Arbiter means transmits said SLOT ID onto said SLOTSEL line one bit at a time starting with a most significant bit, said each Master Elect Arbiter means asserts a first bit of said SLOT ID on a first clock cycle after said all ESYNCH signals are removed from said ESYNCH line, said each Master Elect Arbiter means transmits said first bit of said SLOT ID onto said SLOTSEL line on a second clock cycle after said all ESYNCH signals are removed from said ESYNCH line, said each Master Elect Arbiter means reads said state of said SLOTSEL line on a third clock cycle after said all ESYNCH signals are removed from said ESYNCH line, said each Master Elect Arbiter means decides whether or not to stop transmitting onto said SLOTSEL line and disable said respective Bus Arbiter means on a fifth clock cycle after said all ESYNCH signals are removed from said ESYNCH line.

18. A system in accordance with claim 17, wherein:

said each Master Elect Arbiter means sequentially transmits all remaining bits of said SLOT ID in a manner similar to the transmitting of said first bit.

19. A system in accordance with claim 14, wherein:

said Master Elect arbiter means of said active arbitration module removes said ARBACT signal from said ARBACT line when said ESYNCH signal is present on said ESYNCH line;

each of said plurality of modules being capable of transmitting said ESYNCH signal onto said ESYNCH line to re-elect said active arbiter module.

20. A management system for a backplane of a computer network, the system comprising:

a DATA line;

a PR (Port Ready) line parallel with said DATA line;

a PNR (Port Not Ready) line parallel with said DATA line;

a plurality of modules connected to said DATA, PR and PNR lines, each of said plurality of modules including Transmitter means for transmitting and receiving a packet onto and from said DATA line, each of said Transmitter means transmitting a PR signal onto said PR line if said Transmitter means is properly receiving said packet from said DATA line, each of said Transmitter means transmitting a PNR signal onto said PNR line if said Transmitter means can not properly copy said packet from said DATA line.

21. A system in accordance with claim 20, wherein:

a module transmitting a packet onto said DATA line is a bus master, if a Transmitter means of said bus master detects said PR and PNR signal said packet is fully transmitted onto said DATA line and said packet is held by said bus master for retransmission when said module is again bus master;

if a Transmitter means of said bus master detects only said PNR signal, said packet is aborted and said packet is held by said bus master for retransmission when said module is again bus master, if a Transmitter means of said bus master detects neither said PR and PNR signal said packet is aborted and discarded;

if a Transmitter means detects said PR and not PNR said packet is fully transmitted onto said data line.

22. A system in accordance with claim 21, wherein:

a STAT line is parallel with said DATA line, said Transmitter means transmitting a CYCLE ABORT signal onto said STAT line when said packet is aborted;

said Transmitter means transmitting a RETRY signal onto said STAT line when said Transmitter means retransmits said packet onto said DATA line.

23. A system in accordance with claim 22, wherein:

said each Transmitter means includes register means for determining if a packet transmitted onto said DATA line with said RETRY signal on said STAT line has already been properly received.

24. A system in accordance with claim 23, wherein:

said register means includes a bit for each of said plurality of modules, said register means of a receiving module setting one of said bits to a fail value when said receiving module is unable to receive said packet from a corresponding module;

said transmitting means only copying a packet with a corresponding RETRY signal if a corresponding bit in said register means has said fail value, if said transmitter means successfully copies said packet with said retry signal, said register means sets said corresponding bit to a pass value.

25. A system in accordance with claim 21, wherein:

said Transmitter means is programmable with regard to a number of times said packet is retransmitted.

26. A computer network concentrator system, comprising:

a backplane with a DATA line and an arbitration line in parallel and operating simultaneously with said DATA line;

a plurality of modules connected to said DATA line and said arbitration line, each of said plurality of modules having a unique slot ID, said arbitration line being capable of transmitting any one of said unique slot ID's onto said arbitration line, one of said plurality of modules being an active arbitration module and having a Bus Arbiter means for selecting which of said plurality of modules will transmit data onto said DATA line, said Bus Arbiter means transmitting said unique slot ID of one of said modules onto said arbitration line;

each of said plurality of modules including a Transmitter means for monitoring said arbitration line for a respective said unique slot ID on said arbitration line, said Transmitter means transmitting onto said DATA line upon said Transmitter means detecting that said Arbitration line has said unique slot ID.

27. A computer network concentrator system in accordance with claim 26, wherein:

said Transmitter means in addition only transmits onto said DATA line when said Transmitter means detects that a respective module associated with said Transmitter means has a packet to transmit onto said DATA line.

28. A computer network concentrator system in accordance with claim 26, wherein:

said Transmitter means of all of said plurality of modules listen to said arbitration line in a bus type arrangement.

* * * * *